United States Patent
Gallet (10) Patent No.: US 8,608,440 B2
(45) Date of Patent: Dec. 17, 2013

(54) SIMPLIFIED SYSTEM FOR CONTROLLING PROPELLER BLADE PITCH IN AN AIRCRAFT TURBOSHAFT ENGINE

(75) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 635 days.

(21) Appl. No.: 12/993,531

(22) PCT Filed: May 26, 2009

(86) PCT No.: PCT/EP2009/056357
§ 371 (c)(1),
(2), (4) Date: Nov. 19, 2010

(87) PCT Pub. No.: WO2009/144213
PCT Pub. Date: Dec. 3, 2009

(65) Prior Publication Data
US 2011/0070086 A1  Mar. 24, 2011

(30) Foreign Application Priority Data

May 29, 2008  (FR) ...................................... 08 53502

(51) Int. Cl.
*B63H 3/10* (2006.01)
*B63C 11/30* (2006.01)
*F01D 7/00* (2006.01)

(52) U.S. Cl.
USPC .............. 416/26; 416/147; 416/149; 416/167

(58) Field of Classification Search
USPC ........... 416/26, 147, 149, 153, 154, 167, 205; 192/38, 44, 47
See application file for complete search history.

(56) References Cited

U.S. PATENT DOCUMENTS

| 2,252,544 A | * | 8/1941 | Bennett | 416/26 |
| 2,793,703 A | * | 5/1957 | Mergen et al. | 416/152 |
| 3,186,492 A | * | 6/1965 | Chillson et al. | 416/35 |
| 4,890,979 A | * | 1/1990 | Ames et al. | 416/46 |
| 5,186,608 A | | 2/1993 | Bagge | |
| 5,779,446 A | | 7/1998 | Althof et al. | |
| 7,189,182 B2 | * | 3/2007 | Stevenson et al. | 475/292 |
| 8,132,658 B2 | * | 3/2012 | Kawai et al. | 192/223.2 |

OTHER PUBLICATIONS

International Search Report issued Sep. 18, 2009 in PCT/EP09/056357 filed May 26, 2009.
U.S. Appl. No. 12/993,485, filed Nov. 19, 2010, Gallet.

* cited by examiner

*Primary Examiner* — Edward Look
*Assistant Examiner* — Christopher J Hargitt
(74) *Attorney, Agent, or Firm* — Oblon, Spivak, McClelland, Maier & Neustadt, L.L.P.

(57) ABSTRACT

A system for controlling propeller blade pitch in a turboshaft engine, including: a first track connected to a propeller blade, of which the rotation provides for the setting of the incidence of this blade; a second track; a member actuating the first track, arranged between the first and second tracks, and having a recessed angular portion; and at least one locking member provided between the first and second tracks, housed in the recessed angular portion and in the notch. The locking member can occupy a normal over-center position rendering the first and second tracks integral in rotation, and a release position authorizing the displacement in rotation of a unit including the first track, the locking member, and the actuating member.

17 Claims, 4 Drawing Sheets

SIMPLIFIED SYSTEM FOR CONTROLLING PROPELLER BLADE PITCH IN AN AIRCRAFT TURBOSHAFT ENGINE

TECHNICAL FIELD

This invention generally relates to a system for controlling propeller blade(s) pitch in an aircraft turboshaft engine.

The invention also relates to a propeller provided with such a system for controlling, as well as a method for controlling this system.

The invention applies to any type of propeller, single propeller or contrapropeller system, preferably for turbojet or turboprop engine.

PRIOR ART

A turboprop engine is conventionally provided with a system for controlling the blade pitch of its propeller, in order to adapt the orientation of these blades to the speed of the aircraft.

The system is designed in such a way that the blades remain fixed in incidence when the system for controlling is not actuated, and must therefore make it possible to resist the action of the torque generated by the aerodynamic force that is exerted on the blades during the rotation of the propeller. To do this, the system is generally provided with a mechanism for locking, normally of the type providing contact/friction between two portions, such as a disc brake. In order to control the blades in incidence, it is therefore required to carry out a preliminary step of releasing blades in incidence, through a rupture in the contact between the two portions of the mechanism for locking.

Of course, the presence of the mechanism for locking greatly complicates the conception of the system for controlling, which generates disadvantages in terms of mass, reliability and space.

DESCRIPTION OF THE INVENTION

The invention therefore has for purpose to overcome at least partially the disadvantages mentioned hereinabove, relating to the realisations of prior art.

To do this, the invention has first of all for object a system for controlling propeller blade pitch in a turboshaft engine for aircraft, comprising:

- a first substantially annular track intended to be connected to at least one propeller blade, and of which the rotation is intended to provide for the setting of the incidence of this blade, said first track having at least one notch delimited by two surfaces $B_1$, $B_2$;
- a second substantially annular track, concentric to the first track;
- a member for actuating the first track, substantially annular, arranged between the first and second tracks and concentric to the latter, said member for actuating having at least one recessed angular portion delimited by two surfaces $A_1$, $A_2$ at a distance from one another; and
- at least one locking member provided between the first and second tracks, housed in said recessed angular portion of the member for actuating, and in the notch of the first track, said locking member being able to occupy, during the operation of the turboshaft engine:

- a normal over-centre position, wherein it is on the one hand in contact with the second track by being arranged between the two surfaces $A_1$, $A_2$ of the member for actuating, at a distance from the latter, and on the other hand in contact with the notch, position wherein the aerodynamic force is exerted on the blade of the propeller in rotation generates a torque of a given direction on said first track by causing a first contact force $F_1$, on the locking member, of that of the two surfaces $B_1$, $B_2$ of the notch located the farthest upstream in said given direction of the torque, and generating a reaction force $R$ of said second track on said locking member, the first contact force $F_1$ and the reaction force $R$ providing an over-centring of the first and second tracks, rendering the latter integral in rotation; and
- a release position, wherein the locking member is in contact with said surface $B_1$ of the notch farthest upstream, and also with one of the two surfaces $A_1$, $A_2$ of the member for actuating, this release position being provided by the application of an actuating torque on said member for actuating, of a value making it possible to exert, on the locking member and with said surface $A_1$, $A_2$ concerned, a second bearing force $F_2$ that is sufficient to render null said reaction force $R$ of said second track on said locking member, and as such break said over-centring, said release position authorising the displacement in rotation, in relation to the second track, according to the direction of the actuating torque, of the unit comprising said first track, said locking member and said member for actuating.

The invention is remarkable in that it allows for an automatic locking of the blades when no actuating torque is provided to the member for actuating, and this due to the over-centring created between the first and second tracks, by the locking member occupying its normal over-centre position.

However, when a modification of the pitch of the blades is required, there is the application of a suitable torque and direction on the member for actuating, this torque making it possible to release the system by placing the locking member in its release position, as well as to drive in rotation the first track providing for the setting of the incidence of the blades. Note that the releasing and the rotation of the first track are caused simultaneously or quasi-simultaneously.

As such, the system for controlling the pitch according to the invention is of a simplified design in relation to those encountered in prior art, since the same and single control makes it possible to provide for the releasing and the displacement of the blades in incidence. No separate locking mechanism is therefore required, as was the case beforehand, which generates advantages in terms of mass, reliability and space.

Preferably, the system comprises means of elastic return coupled to said member for actuating, and making it possible, when the latter is not subjected to said actuating torque, to displace in rotation this member for actuating relatively to said first track, in such a way as to bring back said locking member into normal over-centre position.

Preferably, said first track is arranged exteriorly in relation to said second track, although an inverse solution wherein said second track is arranged exteriorly in relation to said first track can be considered, without leaving the scope of the invention.

Preferentially, the system comprises an actuating motor controlling in rotation said member for actuating. It is therefore this motor which is intended to deliver the actuating torque causing the displacement of the locking member in its release position, as well as the rotation of the first track in relation to the second track.

Preferably, said locking member is a roller, and said surfaces $A_1$, $A_2$, $B_1$, $B_2$ with which it cooperates are substantially flat surfaces. An alternative consists in providing that said locking member is a ball, and that said surfaces A1, A2, B1, B2 with which it cooperates are substantially spherical surfaces. In each of these cases, members are therefore provided that roll over each other, which advantageously limits the friction in relation to that encountered on mechanisms for locking of the disc brake type of prior art.

Preferably, the system comprises several locking members spaced angularly from one another around the axis of the first and second tracks, each housed in its own recessed angular portion of the member for actuating, and in its own notch of the first track. This makes it possible to distribute more homogeneously, in the circumferential direction, the forces providing for the over-centring of the first and second tracks. In addition, in the normal over-centre position, each locking member must therefore support compression forces of a lower intensity in relation to those encountered in the solution with a single member, which in particular makes it possible to improve the reliability of the system.

It is possible to provide the system controlling a single blade of the propeller of the turboshaft engine, or simultaneously controlling a plurality of blades of the propeller of the turboshaft engine.

Preferably, the system comprises a sliding member intended to cooperate with the blades in such a way that its displacement leads these blades to come closer/move away from their minimum incidence position, said sliding member being controlled by rotating means of control making it possible to transform their rotating movement into a sliding movement of said member, said rotating means of control being integral in rotation with said first track.

The invention also has for object a propeller for aircraft turboshaft engine comprising at least one system for controlling the blade pitch such as described hereinabove.

This propeller preferably comprises a propeller rotor intended to rotate around a longitudinal axis of the propeller in relation to a stator, and carrying blades, said propeller further comprising said system for controlling blade pitch, making it possible to displace the latter between a minimum incidence position and a maximum incidence position, said system for controlling the pitch comprising a sliding member according to the longitudinal axis, cooperating with said blades in such a way that its displacement leads said blades to come closer/move away from their minimum incidence position, said sliding member being controlled by rotating means of actuating making it possible to transform their rotating movement around the longitudinal axis into a sliding movement of said organ according to the same axis, said rotating means of control being integral in rotation with said first track and the second track being integral in rotation with a drive shaft carrying said propeller rotor, said system for controlling the pitch further comprising an actuating motor making it possible to apply said rotating movement to said second rotating means of actuating, while wing connected to said member for actuating.

Preferably, said rotating means of actuating are comprised of a ball screw.

Preferably, said sliding member is comprised of a sliding cone cooperating with an off-centred finger of each of the blades being associated with it.

The invention also has for object a turbomachine for aircraft, comprising at least one propeller such as described hereinabove.

The turbomachine preferably comprises a contrapropeller system, with each of the two propellers designed in the manner exposed previously, this turbomachine being preferably a turboprop engine, but able alternatively to be a turbojet. Naturally, in this latter case, the propeller system is intended to comprise the fan of the turbojet.

Finally, the invention also has for object a method for controlling a system for controlling propeller blade pitch in a turboshaft engine, such as described hereinabove. According to this method, when a setting of the incidence is required, a suitable actuating torque is applied to said member for actuating.

Other advantages and characteristics of the invention shall appear in the non-restricted detailed description hereinbelow.

BRIEF DESCRIPTION OF THE DRAWINGS

This description shall be provided with regards to the annexed drawings wherein.

DETAILED DESCRIPTION OF PREFERRED EMBODIMENTS

Figure 1:
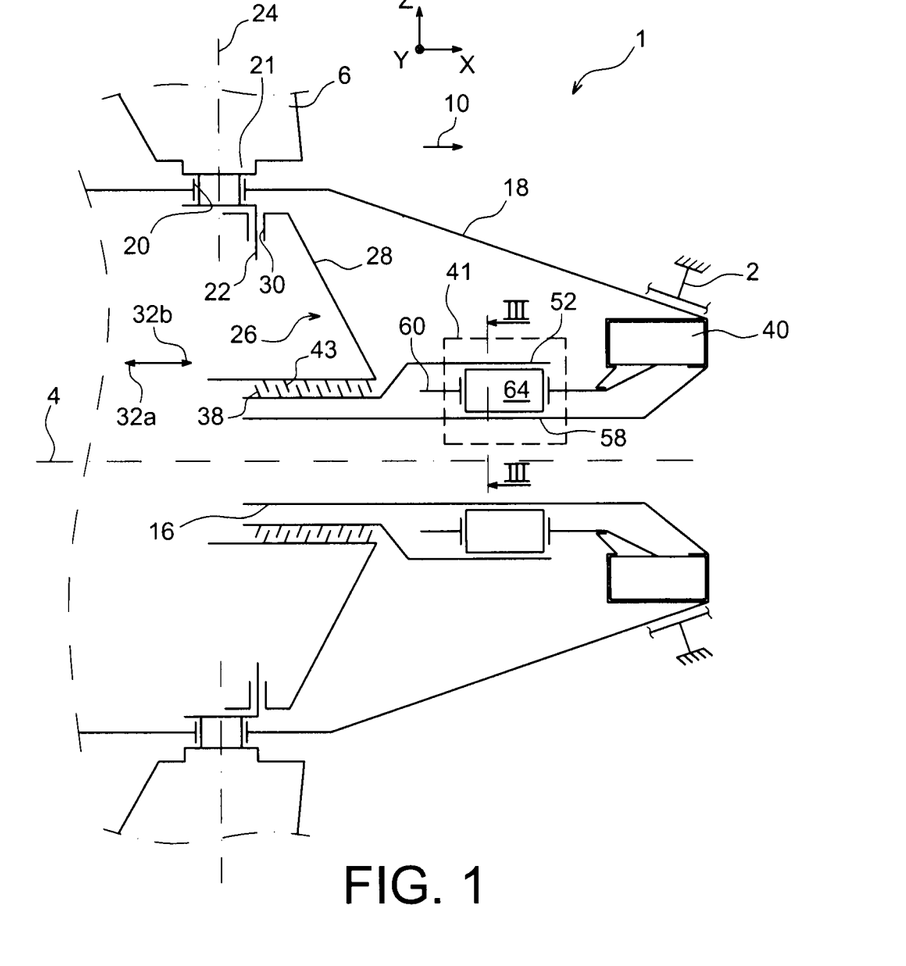
FIG. 1 shows longitudinal cross-section view of a portion of a propeller for aircraft turboshaft engine, according to a preferred embodiment of this invention.

In reference to FIG. 1, a portion of a propeller of a turboprop engine according to a preferred embodiment of this invention can be seen, for example belonging to a contrapropeller system.

The axis X corresponds to the longitudinal direction of the propeller 1, direction which further corresponds to the longitudinal direction of the turboprop engine intended to incorporate such a propeller 1. The axis Y corresponds to the transversal direction of the propeller 1, and the axis Z to the vertical direction or the height, these three axes being orthogonal between themselves.

The propeller 1 comprises a stator or casing 2, centred on a longitudinal axis 4, parallel to the axis X. This stator 2 is of a known manner intended to be integral with the other casings of the turbomachine. In this respect, it is indicated that the propeller 1 is preferably designed in such a way as to be devoid of exterior radial fairing surrounding the blades, i.e. of the "Open Rotor" type, as can be seen in FIG. 1.

In addition, a main direction of flow of the air through the propeller 1 is shown diagrammatically by the arrow 10 parallel to the axis X, this main direction of flow also being used as a reference for the terms "upstream" and "downstream" used hereinbelow.

For the purposes of information, in the case of a contra-propeller system, the two propellers (a single one being shown) are intended to rotate in opposite directions around the axis 4 whereon they are centred, the rotations being carried out in relation to stator 2 remaining immobile.

In all of the description, it is noted that the notion of "rotating speed" of a given member corresponds to its rotating speed in relation to immobile stator 2, according to the longitudinal axis 4, unless it is arranged otherwise.

The propeller 1 comprises a drive shaft 16 centred on the axis 4, and intended to be driven in rotation by a device for mechanical transmission (not shown), for example forming a planetary gear reduction mechanism, itself driven by the turbine of the turbomachine.

This hollow shaft 16 fixedly carries at its downstream end a rotor 18 housing on its exterior radial end, i.e. on its circumferential crown, propeller blades 6. To do this, orifices 20 are made in the rotor 18 centred on the axis 4 in order to house the shank 21 of the blades 6, each one of the latter having an off-centred finger 22 in relation to a main axis 24 of the blade, corresponding preferably to a radial axis of the propeller system 1.

Note that the rotor 18 roughly has a tapered shape coming from the downstream end of the drive shaft 16, and opening upstream.

In a known manner, the off-centred fingers 22 and protruding radially inwards belong to a system for controlling the pitch 26 of the blades, making it possible to displace the latter between a minimum incidence position and a maximum incidence position in relation to the axis 4. The displacement of each blade 6 between these two positions takes place by pivoting the latter on itself, i.e. around its main axis 24, which also corresponds to the axis of the associated orifice 20.

To do this, the system for controlling the pitch 26 comprises a first sliding member, for example of the control cone type 28 centred on the axis 4, and able to slide according to this same axis in relation to the stator.

This control cone 28, for example opening upstream as shown, comprises on its upstream end with a greater diameter a plurality of orifices 30 making it possible to house the off-centred fingers 22 of the blades. As this is also known to those skilled in the art, the displacement of the cone 28 according to a first direction of sliding 32a, i.e. upstream according to the axis 4, leads the blades 6 to come closer to their minimum incidence position, also referred to as minimum angle position or neutral position, in particular sought in order to carry out a feathering of the propeller 1. As mentioned previously, the rotation of the blades 6 within their orifices 20 according to their axes 24, towards their neutral position opposite to that shown in FIG. 1, is carried out in response to the bearing of the cone in translation 28 on the off-centred fingers 22 that it carries. In FIG. 1, the cone 28 is indeed shown in its end-of-travel position in the second direction of sliding 32b, wherein it allows the blades 6 to adopt their maximum incidence position, opposite the neutral position providing for the feathering of the propeller. Nevertheless, the system 1 could alternatively be designed in such a way that the neutral position of the blades 6a is obtained with the cone 28 placed at the end of travel in this second direction of sliding 32b opposite the first 32a, without leaving the scope of the invention.

Still in reference to FIG. 1, in the same way as that described hereinabove, the displacement of the cone 28 according to the second direction of sliding 32b, i.e. downstream according to the axis 4, therefore leads the blades 6 to come closer to their maximum incidence position. Here again, the rotation of the blades 6 according to their axes 24, towards their maximum incidence position, is carried out in response to the bearing of the cone in translation 28 on the off-centred fingers 22 that it carries.

Note that due to the housing of the off-centred fingers 22 in the orifices 30 of the cone, possibly by the intermediary of ball connections, the shaft 16, the rotor 18 and the blades 6 jointly forming a unit which is integral in rotation according to the axis 4. For the purposes of information, the displacement of the fingers 22 and of the cone 28 can take the form of a combination of a translation according to the axis 4 and of a rotation around this axis. Still for the purposes of information, it is possible to overcome this double movement by introducing a ring between the off-centred fingers of blade shank, and this same cone. The aforementioned movement of rotation then takes place between the ring and the cone, consequently implying that the latter provide a drive only in axial translation.

In order to provide for the translation of the control cone 28 according to the directions 32a and 32b, the system for controlling the pitch 26 is provided with a rotating means of actuating, for example of the ball screw 38 type, centred on the axis 4. This screw 38 is designed in a conventional manner, in such a way as to make it possible to transform its rotating movement around the axis 4, into a sliding movement of the cone 28 according to this same axis 4, in the manner of a worm screw.

The screw 38 is located around the shaft 16, and is itself surrounded by the control cone 28, of which a substantially cylindrical interior portion 43 cooperates with the outside threading of the screw 38, constantly remaining fixed in translation in relation to rotor 18 and to the stator 2. In this regard, it is noted that the cone 28 is the only one of the members of the aforementioned propeller 1 to be able to be displaced in translation according to the axis 4 in relation to stator 2, the other members remaining fixed in translation in relation to one another, and in relation to this same stator 2.

The downstream end of the ball screw 38 cooperates indirectly with a motor 40 making it possible to apply, via a module for transmitting and locking 41, the rotating movement to this same screw, aiming for a displacement in translation of the cone 28. It is for example provided that the motor 40 has a fixed stator on the rotor 18 of the propeller 1, for example in an annular base of this rotor 18, and also has a fixed rotor on the module for transmitting and locking 41, which shall now be described in reference to FIGS. 2 and 3.

Figure 2:
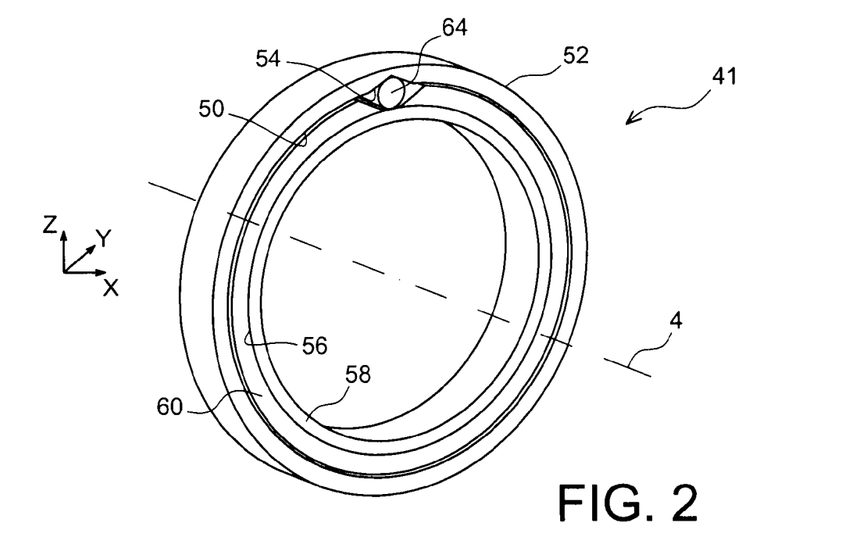
FIG. 2 shows a perspective view of a module for transmitting and locking provided on the system for controlling the blade pitch of the propeller of FIG. 1.
Figure 3:
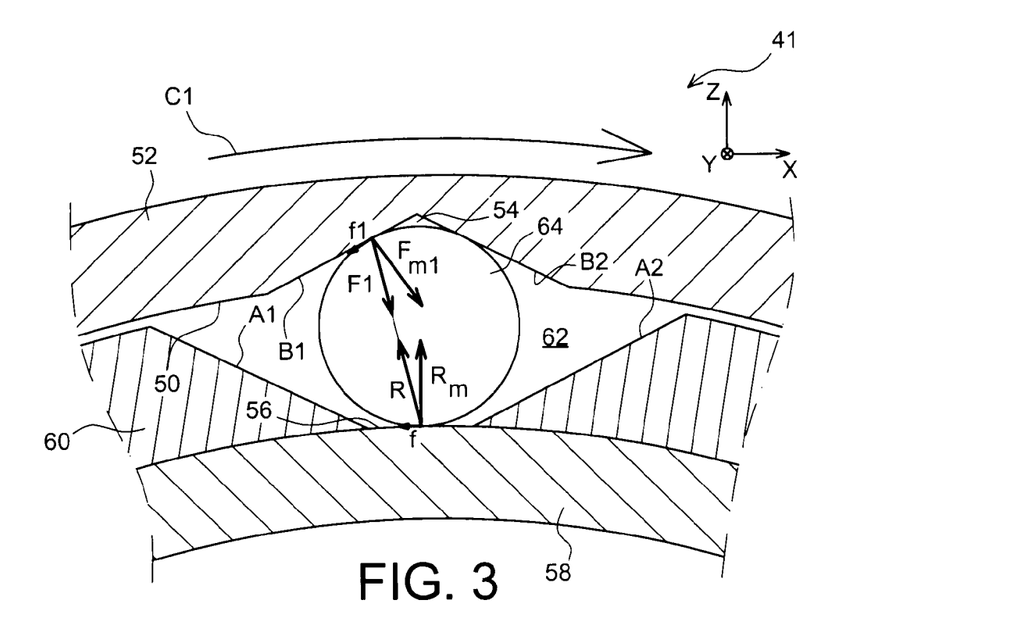
FIG. 3 shows said module for transmitting and locking, as a transversal section taken according to the line III-III of FIG. 1, with the locking member of the module occupying its normal over-centre position.

The module 41, specific to this invention, comprises a first substantially annular track 50, belonging to a first annular portion 52 or ring, centred on the axis 4. This portion 52, which preferably constitutes the external portion of the module, is intended to be fixedly connected on the screw 38, for example to a downstream end of the latter. Alternatively, and as shown in FIG. 1, this annular portion 52 can be integral with the screw, by constituting the downstream end of the latter. Consequently, the rotation of this portion 52 is intended to provide for the setting of the incidence of the blades, in particular by the intermediary of the cone 28 described hereinabove.

The first track 50 is therefore formed on the interior surface of the ring 52, and has a notch 54 delimited by two surfaces B1 and B2. In transversal section such as that shown in FIG. 3, the two surfaces B1 and B2, each preferably flat, jointly forming a V directed towards the axis of the propeller, i.e. radially inwards. The angle of the V is relatively open, for example of a value between 100 and 170°, the value being in particular chosen according to the coefficients of friction of the materials present, in order to be able to generate an over-centring. In this regard, the V is symmetrical in relation to a radial direction passing through the tip of the V, the angle between each branch of the V and the circumferential local direction, i.e. the tangential direction, being preferably between 5 and 85°, still chosen preferentially according to the coefficients of friction of the materials present.

The module 41 comprises a second substantially annular track 56, concentric to the first track, and belonging to a second annular portion 58 or ring, centred on the axis 4. This portion 58, which preferably constitutes the internal portion of the module, is intended to be fixedly connected on the shaft 16. Alternatively, and as shown in FIG. 1, This annular portion 58 can be integral with the drive shaft 16, by forming a longitudinal section of the latter. The second track 56 is therefore formed on the exterior surface of the ring 58.

The module 41 is on the other hand provided with a member for actuating 60 the first track, substantially annular, arranged between the first and second tracks, and concentric to the latter. This member 60 is preferably in annular contact with the second track 56, and also possibly in annular contact with the first track 50. It is connected, preferably directly, to the rotor of the motor 40 in order to be able to be put into rotation by the latter.

It has a recessed angular portion 62, delimited by two surfaces A1, A2 at a distance from one another in the circumferential direction. In the transversal section such as that shown in FIG. 3, the two surfaces A1 and A2, each preferably flat, are substantially oriented towards the exterior, i.e. towards the first track 50, and more specifically towards its notch 54. The angle between each surface A1, A2 and the circumferential local direction, i.e. the tangential direction, is preferably between 5 and 85°, and more preferentially identical to the angle defined hereinabove between the surface B1 or B2 and the circumferential local direction. The two surfaces A1, A2 are also oriented, to a certain degree, one towards the other, in order to form an upper portion of a V opening radially towards the exterior, and of which the tip has voluntarily been suppressed in order to allow room for the second track 56.

Preferably, in the normal position shown in FIG. 3, which shall be explained hereinafter, the surface A1 is arranged substantially across from and parallel to the surface B2 of the notch, while the surface A2 is arranged substantially across from and parallel to the surface B1 of the notch.

In addition, the two ends of the member for actuating 60 that is mobile in rotation are arranged at a distance from one another in the circumferential direction, in order to allow for the contact between a locking member 64 of the module, and the second track 56. This locking member 64, preferably in the form of an axis roller parallel to the axis X, is indeed provided between the first and second tracks 50, 56, housed in the recessed angular portion 62, and in the notch 54 of the first track.

FIG. 3 shows the module 41 with the locking member 64 occupying, during the operation of the turboshaft engine, a normal over-centre position.

In this position, it is one the one hand in contact with the second track 56 by being arranged between the two surfaces A1, A2, at a distance from the latter, and on the other hand in contact with the notch 54. During the operation of the turboshaft engine causing the rotation of the propeller, an aerodynamic force is exerted on the blades, and generates a torque C1 of a given direction on the first portion 52, due to its mechanical connection to the blades via the cone 28 and the screw 38.

This torque C1, shown diagrammatically by the arrow of FIG. 3, causes a first contact force F1 with the surface B1 on the locking member 64, the surface B1 corresponding effectively to that of the two surfaces B1, B2 of the notch located farthest upstream in the given direction of the torque C1, here the clockwise direction. For the purposes of information, the contact force F1 can be broken down into a formal force Fn1 orthogonal to the surface B1, and a friction force f1.

This force F1 generates a reaction force R of the second track 56 on the locking member 64, further breaking down into a formal orthogonal force Rn locally on the track 56, and a friction force f.

In the case at hand, the roller 64 is preferably in contact only with the two aforementioned members B1, 56. The first contact force F1 and the reaction force R remaining inside the friction cone, they then provide for an over-centring of the first and second tracks 50, 56, rendering the latter integral in rotation.

In this normal over-centre position, when the motor 40, referred to as a propeller feather motor, is idle, the second track 56 is driven in rotation by the shaft 16, this rotation being transmitted to the first track 50 par the over-centring, then of course to the integral screw 38 carrying the first track 50. Consequently, the unit formed by the members 16, 18, 41, 38, 28, 6 is integral in rotation, and therefore rotates in the same direction and at the same rotating speed applied by the shaft 16, in such a way that the pitch of the blades is not modified. In addition, the locking provided automatically by the roller 64 of the module 41 comprises an anti-return system rendering the aerodynamic force being applied on the blades without impact on the incidence of the latter, which therefore remains retained at the initially-set value.

In order to vary the incidence of the blades, the system 26 must be controlled in order to bring the roller 64 into another position, referred to as the releasing position.

Figure 4:
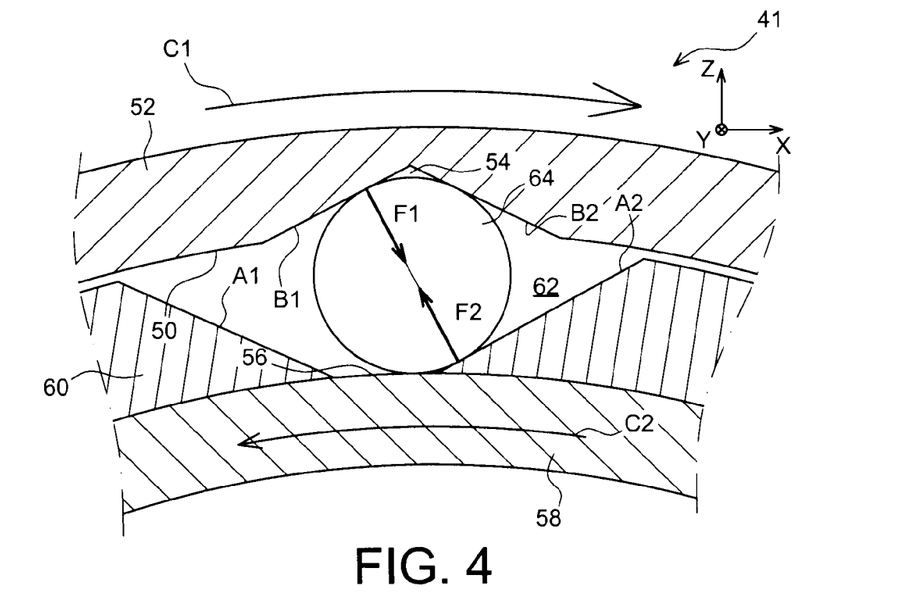
FIG. 4 shows a view similar to that of FIG. 3, with the locking member of the module occupying its release position, adopted during a pitch of the blades aimed at reducing the incidence of the latter.

FIG. 4 relates to the case wherein the blades must be modified in incidence to their minimum incidence position.

In this configuration, the release position of the member 64 is such that it is in contact with the surface B1 of the notch the farthest upstream, and also with the surface A2 of the member for actuating 60. This release position is provided by the application of an actuating torque C2 on the member for actuating 60, by the motor 40, therefore driving it to come into contact with the roller 64. The actuating torque C2, here being directed in the anti-clockwise direction, is of a value making it possible to exert, on the roller 64, with the surface A2 involved, a second bearing force F2 that is sufficient to render null the reaction force R of the second track 56 on this roller. As such, with the application of the actuating torque C2, the roller 64 is no longer in contact only with the surface B1 and with surface A2, and also possibly in contact with the surface B2, but more in contact with the second track 56. Preferably, the two forces F1, F2 are of identical value, supported by the same diametral direction of the roller 64, and of opposite direction, this in particular thanks to the substantially parallel positioning of the two surfaces A2, B1.

The over-centring observed in the normal position is as such broken.

In this release position, the displacement in rotation is therefore authorised, in relation to the second track 56, of the unit comprising the first track 50, the roller 64 and the member for actuating 60, under the effect of the actuating torque C2 applied by the motor.

As such, the actuating torque C2 makes it possible simultaneously to release the module 41, and to cause the rotation of the ring 52 in relation to the ring 58 of the shaft 16.

When the motor 40 is actuated to deliver this torque C2, the rotating speed of the screw 38 in relation to stator 2 becomes different from that of the cone 28, in relation to stator 2, with this cone 28 still integral with the rotor 18, wherein the creation of a relative rotating speed between these two members, leading to the desired sliding in the direction 32a of the cone 28 along the screw 38 remaining immobile in translation in relation to stator 2. It is in this way, i.e. by controlling the motor 40 in such a way that it delivers to the member 60 an actuating torque C2 of a suitable value, that it is possible to control the pitch of the blades 6, from their maximum incidence position to their minimum incidence position.

Once the motor 40 is stopped, the module 41 is automatically brought back to its configuration providing the normal position of locking of the roller 64, by the intermediary of means of elastic return coupled to the member for actuating 60, such as a spring (not shown). This spring indeed makes it possible to displace in rotation this member for actuating 60 relatively to the first track 50, in such a way as to break the contact between the roller 64 and the surface A2, benefitting a new contact between this same roller 64 and the second track 56 providing the over-centring.

Figure 5:
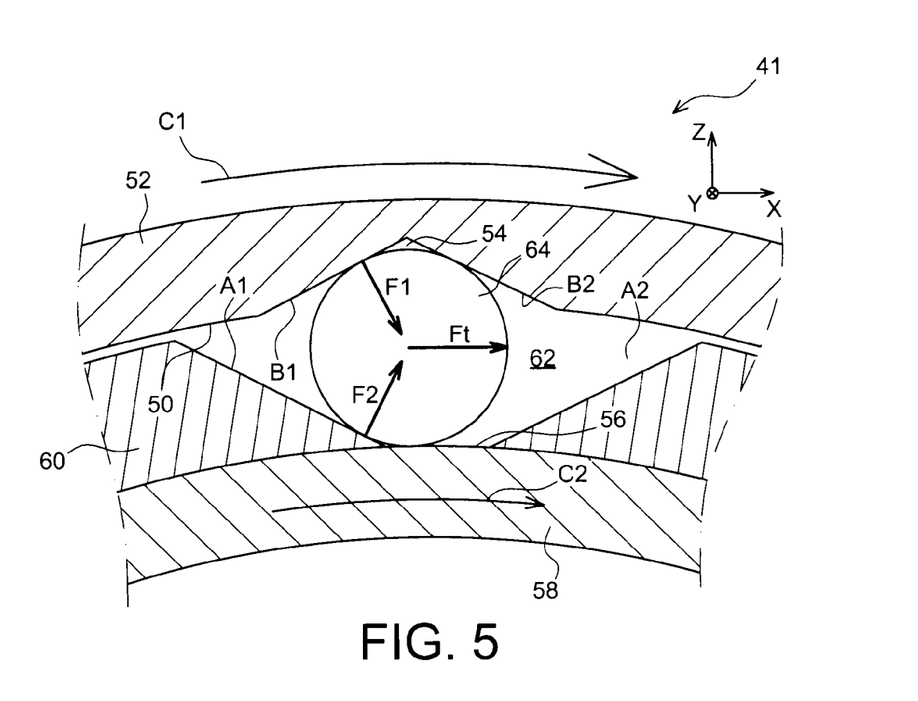
FIG. 5 shows a view similar to that of FIG. 4, with the locking member of the module occupying its release position, adopted during a pitch of the blades aimed at increasing the incidence of the latter.

In the other situation where the blades 6 must be modified in incidence to their maximum incidence position, the release position of the member 64, shown in FIG. 5, is such that it is in contact with the surface B1 of the notch farthest upstream, and also with the surface A1 of the member for actuating 60. This release position is provided by the application of an actuating torque C2 on the member for actuating 60, by the motor 40, thus driving it to come into contact with the roller 64. The actuating torque C2, here is directed in the clockwise direction, is of a value making it possible to exert, on the roller 64, with the surface A1 concerned, a second bearing force F2 that is sufficient to render null the reaction force R of the second track 56 on this roller. As such, with the application of the actuating torque C2, the roller 64 is no longer in contact only with surface B1 and with the surface A1, and also possibly in contact with the surface B2, but more in contact with the second track 56. Preferably, the two forces F1, F2 are of identical value, of which the resulting Ft is supported by the tangential direction, this in particular thanks to an inclination of a value that is substantially identical between on the one hand the circumferential direction and the surface A1, and on the other hand the circumferential direction and the surface B1.

As the resulting force Ft is tangential, the reaction R of the track 56 on the roller 64 is necessarily null. Consequently, the over-centring observed in the normal position is broken.

In this release position, the displacement in rotation is therefore authorised, in relation to the second track 56, of the unit comprising the first track 50, the roller 64 and the member for actuating 60, under the effect of the actuating torque C2 applied by the motor.

As such, the actuating torque C2 makes it possible to simultaneously release the module 41, and to cause the rotation of the ring 52 in relation to the ring 58 of the shaft 16, in the direction of the torque C2.

As such, when the motor 40 is actuated to deliver this torque C2, the rotating speed of the screw 38 becomes different from that of the cone 28 which is still integral with the rotor 18, wherein the creation of a relative rotating speed between these two members, leading to the desired sliding in the direction 32b of the cone 28 along the screw 38 remaining immobile in translation in relation to stator 2. It is in this way, i.e. by controlling the motor 40 in such a way that it delivers to the member 60 an actuating torque C2 of a suitable value, that it is possible to control the pitch of the blades 6, from their minimum incidence position to their maximum incidence position.

Here again, once the motor 40 is stopped, the module 41 is automatically brought back to its configuration providing the normal position of locking of the roller 64, by the intermediary of the aforementioned means of elastic return, coupled to the member for actuating 60 in the form of a machine cut-off ring.

Figure 6:
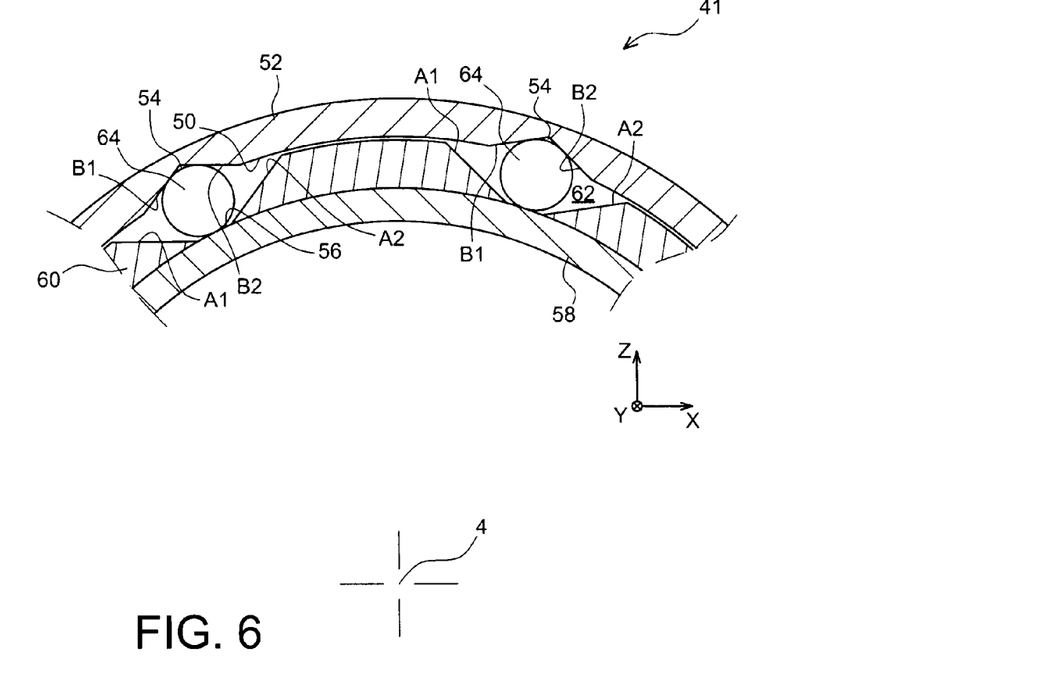
FIG. 6 shows the module for transmitting and locking, according to another preferred embodiment of this invention.

In this regard, according to another preferred embodiment of this invention, several locking members angularly spaced from one another are provided around the axis 4, as shown in FIG. 6. Each is housed in its own recessed angular portion 62 of the member for actuating 60, and in its own notch 54 of the first track 50. The motor 40 is here also designed to deliver the actuating torque C2 to the member 60, providing the breakage of the over-centrings created by the rollers 64. This configuration makes it possible to globally distribute more homogeneously, in the circumferential direction, the forces providing the over-centring of the first and second tracks.

Furthermore, note that if the locking member 64 is preferably a roller, and the surfaces A1, A2, B1, B2 with which it cooperates, substantially flat surfaces, an alternative embodiment can consist in providing that the locking member is a ball, and the surfaces A1, A2, B1, B2 are substantially spherical surfaces.

Figure 7:
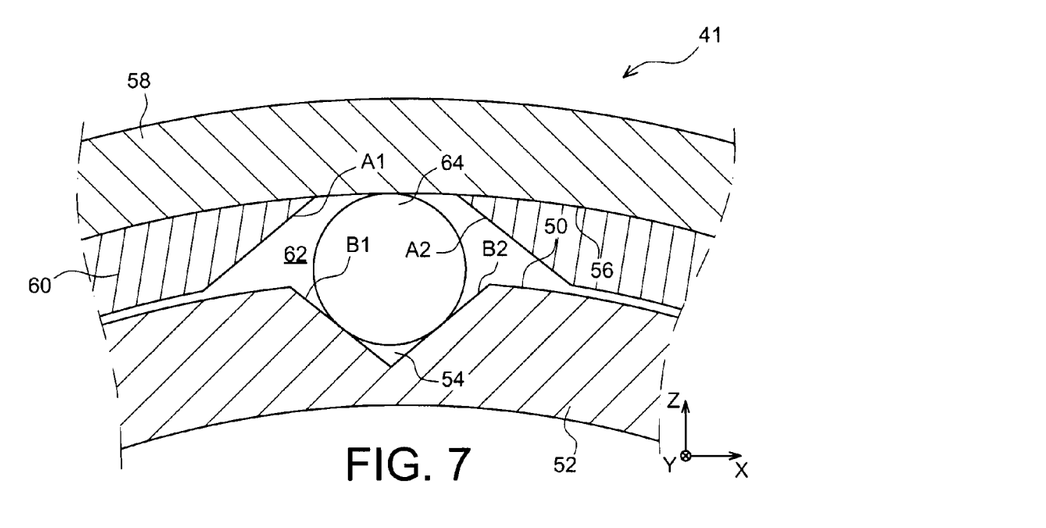
FIG. 7 shows the module for transmitting and locking, according to yet another preferred embodiment of this invention.

Finally, in reference to FIG. 7, note that a configuration, wherein the first track 50 belongs to an interior ring 52 and the second track 56 belongs to an exterior ring 58, can be considered, in particular in the case where the system for controlling applies to the pitch of a single blade of the propeller. In such a case, a system for controlling 26 is therefore associated to each blade of this propeller.

Of course, diverse modifications can be made by those skilled in the art to the invention which has just been described, solely by way of non-restricted examples.

The invention claimed is:

1. A system controlling blade pitch of a propeller of a turboshaft engine for an aircraft, comprising:
    a substantially annular first track configured to be connected to at least one propeller blade, and of which its rotation is configured to provide for setting of incidence of the blade, the first track including at least one notch delimited by two surfaces;
    a second substantially annular track, concentric to the first track;
    an actuating member that actuates the first track, substantially annular, arranged between the first and second tracks and concentric to the second tracks, the actuating member including at least one recessed angular portion delimited by two surfaces at a distance from one another; and
    at least one locking member provided between the first and second tracks, housed in the recessed angular portion of the actuating member, and in the notch of the first track, the locking member to occupy, during operation of the turboshaft engine:
        a normal over-center position, in contact with the second track by being arranged between the two surfaces of the actuating member, at a distance from the actuating member, and in contact with the notch, wherein aerodynamic force exerted on the blade of the propeller in rotation generates a torque of a given direction on the first track by causing a first contact force, on the locking member, of that of two surfaces of the notch located farthest upstream in a given direction of the torque, and generating a reaction force of the second track on the locking member, the first contact force and the reaction force providing an over-centering of the first and second tracks, rendering the second tracks integral in rotation; and a release position, wherein the locking member is in contact with the surface of the notch farthest upstream, and also with one of the two surfaces of the actuating member, the release position being provided by application of an actuating torque on the actuating member, of a value making it possible to exert, on the locking member with the surface concerned, a second bearing force that is sufficient to render null the reaction force of the second track on the locking member, and as such break the over-centering, the release position authorizing displacement in rotation, in relation to the second track, according to the direction of the actuating torque, of a unit comprising the first track, the locking member, and the actuating member.

2. A system for controlling according to claim 1, further comprising means for elastic return coupled to the actuating member, and making it possible, when the actuating member is not subjected to the actuating torque, to displace in rotation the actuating member relatively to the first track, to bring back the locking member into the normal over-center position.

3. A system for controlling according to claim 1, wherein the first track is arranged exteriorly in relation to the second track.

4. A system for controlling according to claim 1, wherein the second track is arranged exteriorly in relation to the first track.

5. A system for controlling according to claim 1, further comprising an actuating motor controlling in rotation the actuating member.

6. A system for controlling according to claim 1, wherein the locking member includes a roller, and the surfaces with which it cooperates are substantially flat surfaces.

7. A system for controlling according to claim 1, wherein the locking member includes a ball, and the surfaces with which it cooperates are substantially spherical surfaces.

8. A system for controlling according to claim 1, comprising plural locking members angularly spaced from one another around the axis of the first and second tracks, each housed in its own recessed angular portion of the member for actuating, and in its own notch of the first track.

9. A system for controlling according to claim 1, to control a single blade of the propeller of the turboshaft engine.

10. A system for controlling according to claim 1, to simultaneously control a plurality of blades of the propeller of the turboshaft engine.

11. A system for controlling according to claim 10, further comprising a sliding member configured to cooperate with the blades such that its displacement leads the blades to come closer/move away from the minimum incidence position, the sliding member being controlled by rotating means of control making it possible to transform their rotating movement into a sliding movement of the member, the rotating means of control being integral in rotation with the first track.

12. A method for controlling a system for controlling propeller blade pitch in a turboshaft engine according to claim 1, wherein when a setting of the incidence is required, a suitable actuating torque is applied to the member for actuating.

13. A propeller for an aircraft turboshaft engine comprising at least one system for controlling the blade pitch according to claim 1.

14. A propeller according to claim 13, further comprising a propeller rotor configured to rotate around a longitudinal axis of the propeller in relation to a stator, and carrying blades, the propeller further comprising the system for controlling the pitch of the blades, making it possible to displace the blades between a minimum incidence position and a maximum incidence position, the system for controlling the pitch comprising a sliding member according to the longitudinal axis, cooperating with the blades such that its displacement drives the blades to come closer/move away from their minimum incidence position, the sliding member being controlled by rotating means for actuating making it possible to transform their rotating movement around the longitudinal axis into a sliding movement of the member according to the same axis, the rotating means for control being integral in rotation with the first track and the second track being integral in rotation with a drive shaft carrying the propeller rotor, the system for controlling the pitch further comprising an actuating motor to apply the rotating movement to the rotating means for actuating, by being connected to the member for actuating.

15. A propeller according to claim 14, wherein the rotating means for actuating comprises a ball screw.

16. A propeller according to claim 14, wherein the sliding member comprises a sliding cone cooperating with an off-centered finger of each of the blades being associated with it.

17. A turbomachine for an aircraft comprising at least one propeller according to claim 13.

* * * * *